United States Patent Office.

HEINRICH PAULSEN, OF HAMBURG, GERMANY.

PROCESS OF PRESERVING FOOD.

SPECIFICATION forming part of Letters Patent No. 526,735, dated October 2, 1894.

Application filed May 8, 1894. Serial No. 510,440. (No specimens.)

*To all whom it may concern:*

Be it known that I, HEINRICH PAULSEN, merchant, of 63 Hafenstrasse, Hamburg, in the German Empire, have invented a new and useful Process for the Preservation of Food, of which the following is a specification.

The object of this process is to preserve articles of food such as meat, fish, fowl, game, caviare, &c., in their natural and fresh condition, for purposes of storage or transport, so that they should lose none of their original taste, flavor or appearance; such object being accomplished without the employment of ice, the action of which has in many cases proved injurious.

The purpose of the invention is fulfilled by pouring over the substances to be preserved a special preserving mass, or by placing them in receptacles formed of such mass. The preserving mass itself is obtained by subjecting plants of such classes as *Gelidium, Glocopeltis* or *Chondrus* to an extracting process by the aid of boiling water, the decoction being further boiled with glycerin, preferably with the addition of agents inimical to putrefaction. The preserving mass thus prepared enables the substances to be preserved, to be hermetically protected from contact with the air. The admixture of glycerin, moreover, prevents any of the liquid parts of the mass from becoming incorporated into the food, so that the natural taste, flavor and color of the food are retained entire and unaltered.

The process is carried out in practice in the following manner:

The following plants are preferably employed in preparing the preserving mass: *Gelidium amansii, Gelidium corneum, Gelidium cartilagineum, Glocopeltis filicina,* and *Chrondus crispus.* These plants are steeped in water for twenty-four hours and heated to 200° centigrade for a period of from five to six hours. The plants, after this treatment, are pressed through suitable straining devices, when they yield an adhesive juice in a pure condition, which juice, when it cools down, assumes the appearance and consistence of perfectly transparent jelly. This jelly is then placed in a paraffin bath heated to 200° centigrade, and to every one thousand parts by weight of the jelly, there are added two thousand parts by weight of water, two hundred and fifty parts by weight of glycerin, and fifty parts by weight of alum, or thirty parts by weight of boracic acid. The boiling is continued until the liquid is reduced by evaporation to eighteen hundred parts by weight, whereupon it is cooled down to 8° centigrade. Food may be preserved by means of this mass according to two alternative methods.

The dried substances to be preserved may either be placed in suitable sheet-metal receptacles, the preserving mass being then poured over them; or special receptacles are cast of the mass itself, in which the food to be preserved is incased. The orifice of such receptacles or cases is then closed by means of a plate of the same material, and the joints closed by melting the edges together. The latter method will be found particularly convenient in the preservation of caviare.

When the food incased in the preserving material is to be used for consumption it is simply cut out of the preserving case or sheath, it being unnecessary to be very careful in removing every particle of the preserving mass since it is devoid of any unpleasant taste. When however it is desirable that there should be no possibility of any of the preserving mass adhering to the food, the latter may, before it is incased, be enveloped in thin canvas or gauze.

What I claim, and desire to secure by Letters Patent of the United States, is—

A process of preservation of food and similar articles consisting in first submitting plants such as *Gelidium, Glocopeltis* or *Chondrus* to an extracting process by the use of boiling water, the decoction being further boiled together with glycerin and with the addition of antiseptic agents; the substances to be preserved being then enveloped in the mass thus prepared, which is either poured over them or made into receptacles or cases adapted to receive the food to be preserved; whereby the food is effectively protected from contact with the air, and caused to retain its natural properties, taste, flavor and appearance unaltered, substantially as described.

In witness whereof I have hereunto set my hand in presence of two witnesses.

HEIN. PAULSEN.

Witnesses:
PAUL FISCHER,
A. SAUDELN.